Sept. 19, 1950 R. G. REYNOLDSON 2,523,236
MACHINE FOR APPLYING SOLDER CONTACTS
Filed Nov. 17, 1945 4 Sheets-Sheet 1
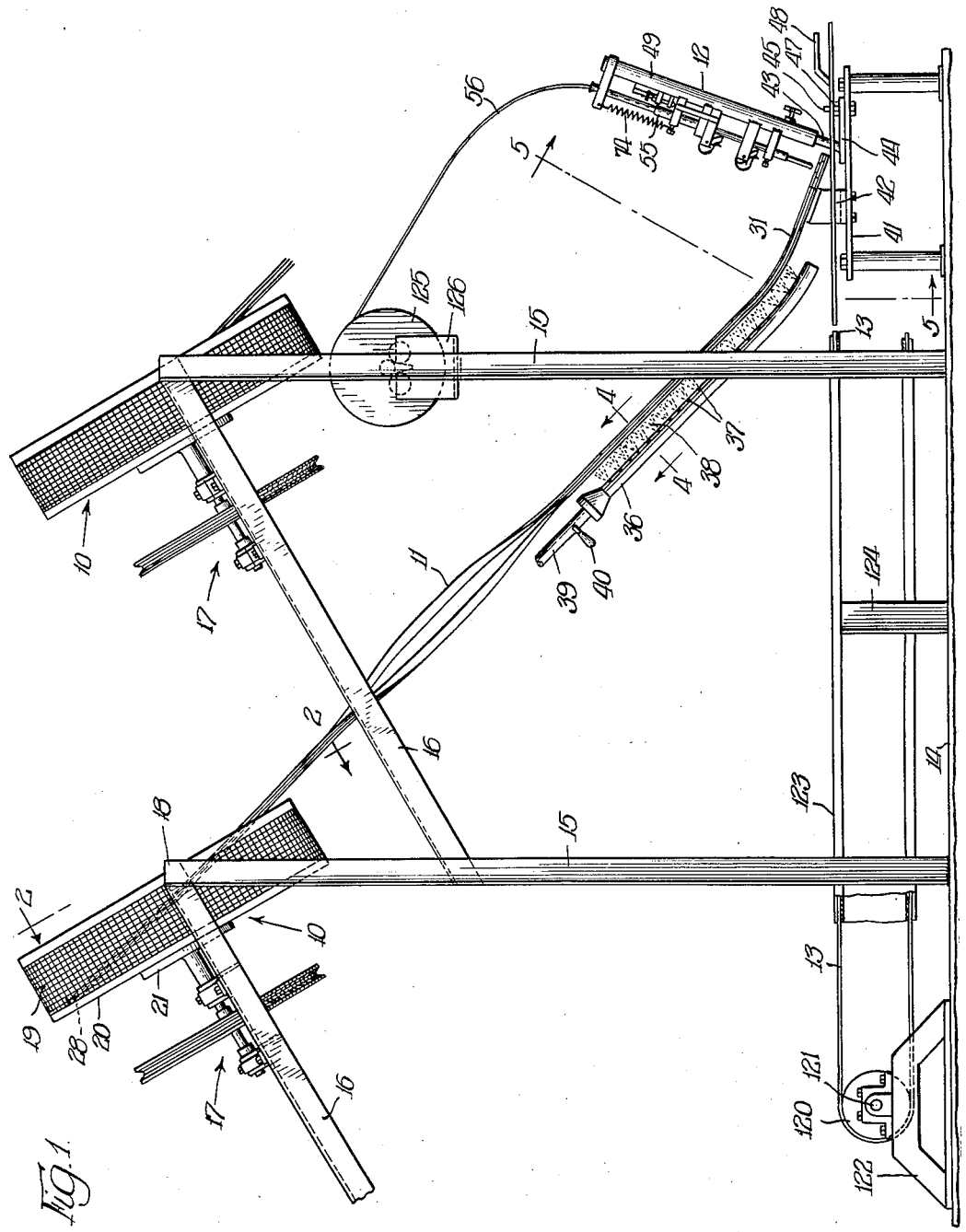
INVENTOR.
Roland G. Reynoldson,
BY
Cromwell, Greist & Warden
attys.

Sept. 19, 1950 R. G. REYNOLDSON 2,523,236
MACHINE FOR APPLYING SOLDER CONTACTS
Filed Nov. 17, 1945 4 Sheets-Sheet 2
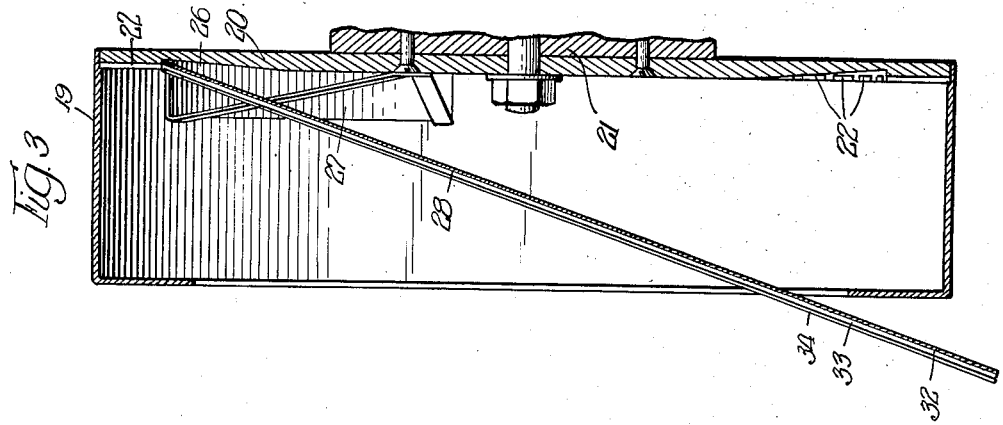
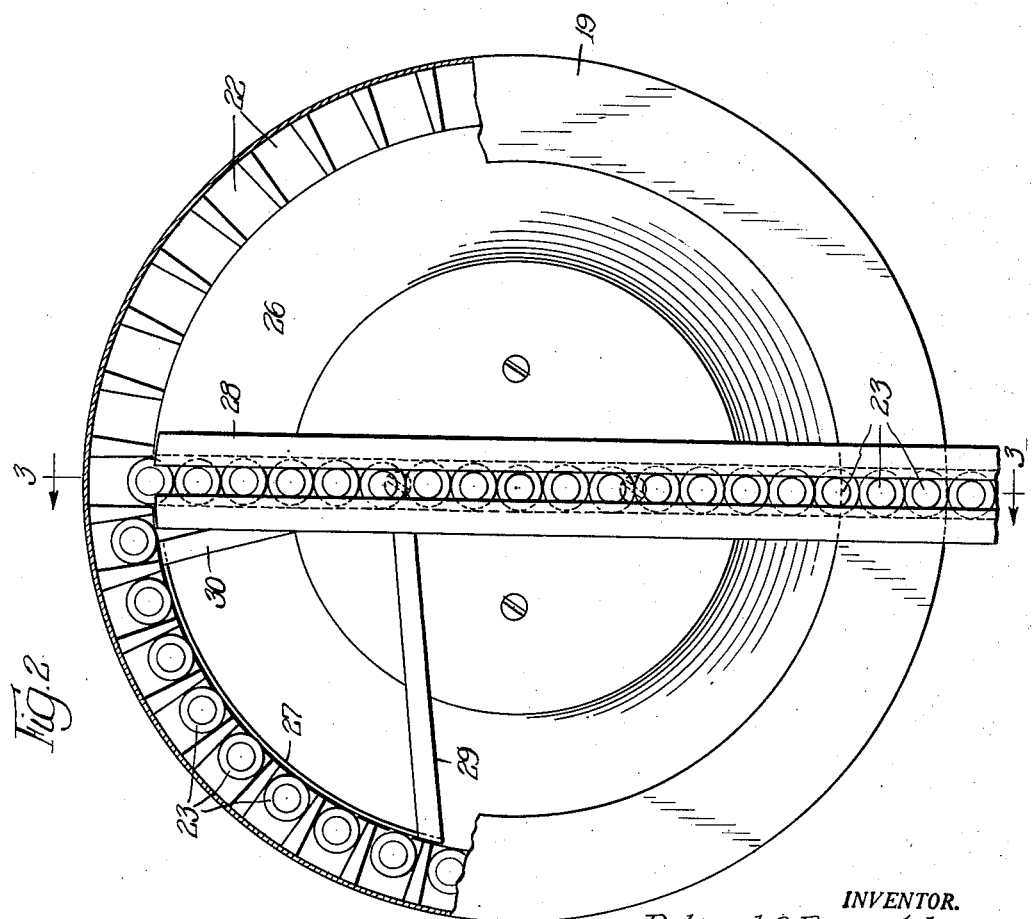
INVENTOR.
Roland G. Reynoldson,
BY
Cromwell, Greist & Warden
Attys.

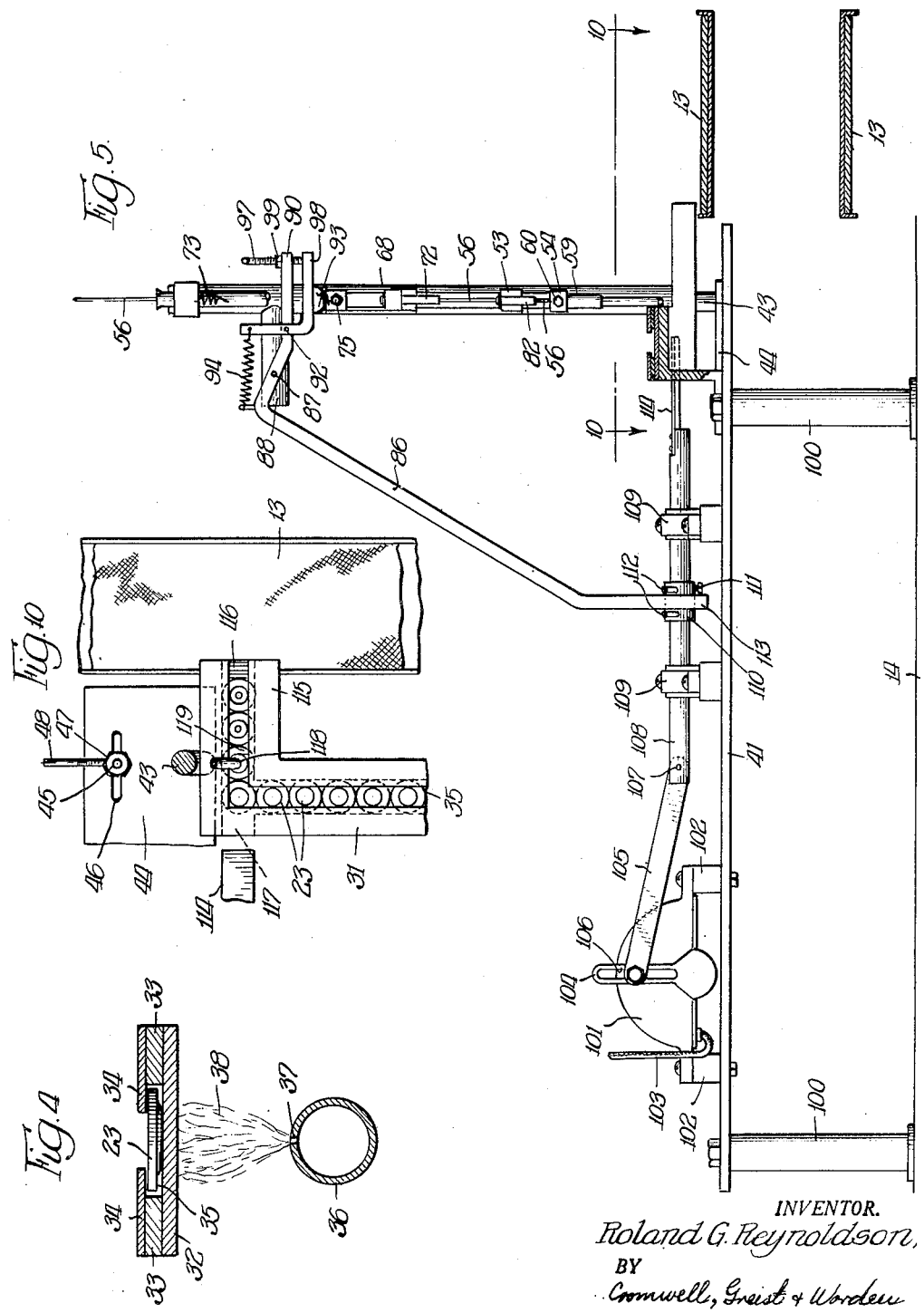

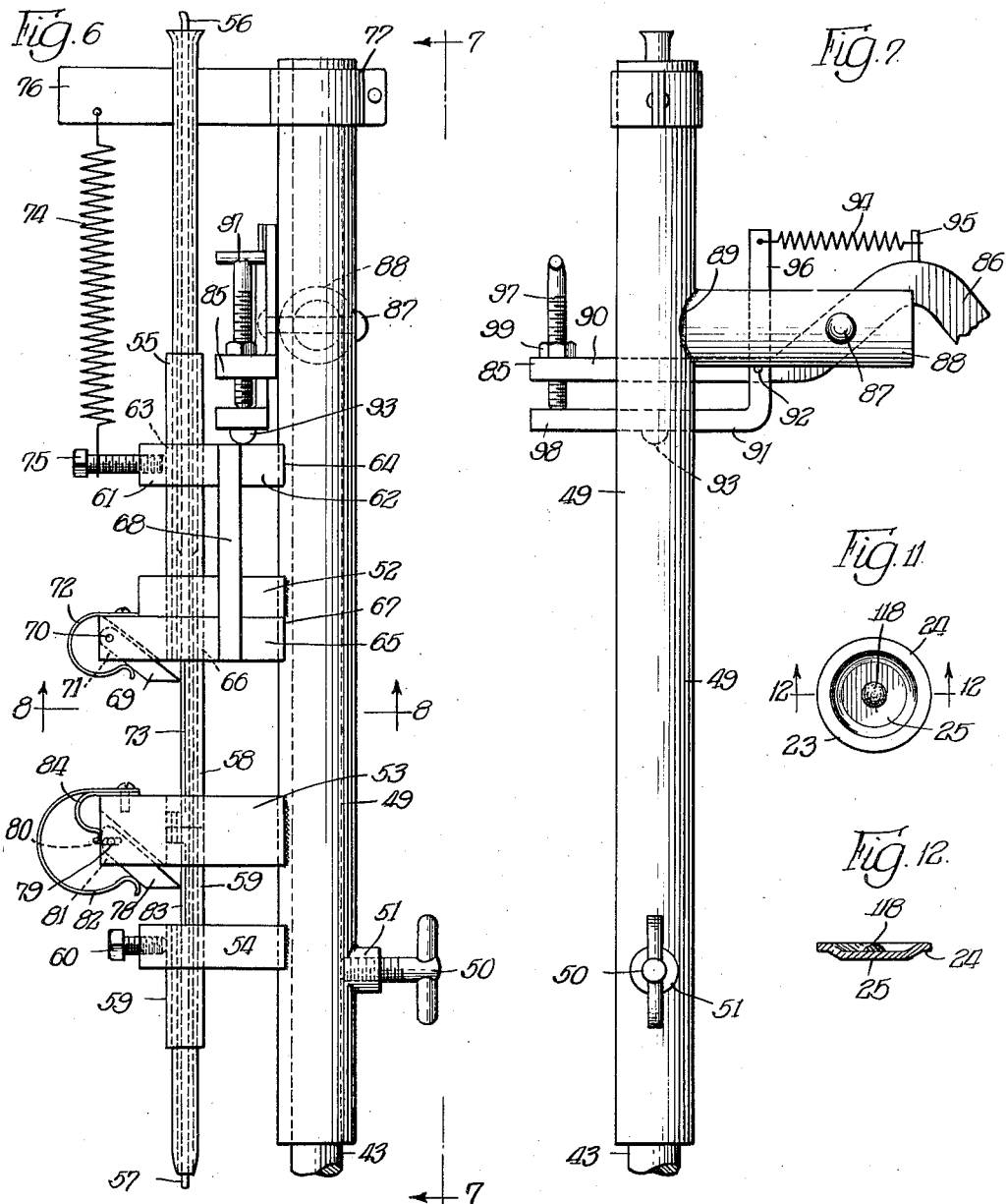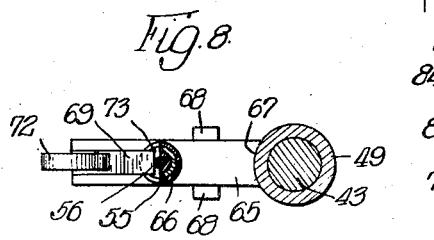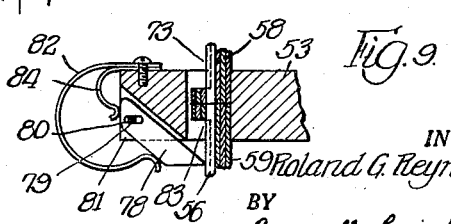

Patented Sept. 19, 1950

2,523,236

UNITED STATES PATENT OFFICE 2,523,236

MACHINE FOR APPLYING SOLDER CONTACTS

Roland G. Reynoldson, Madison, Wis.

Application November 17, 1945, Serial No. 629,220

7 Claims. (Cl. 113—59)

My invention is concerned with improvements in machines for applying a spot of solder on a metal disk or other work piece.

In the manufacture of battery cells of a certain type a metal disk is required which forms the top closure of the cell. To provide a good electrical contact thereon a spot of solder is required to be deposited on the top central portion of the disk. Such disks usually have the central portion shaped to form a concave-convex section and the solder is placed on the concave surface thereof. In order to apply the required solder to the concave surface portion of a plurality of these disks, it is desirable to automatically arrange the disks with the concave surface uppermost, apply heat to the disks, spot each one with solder and allow them to cool. It is an object of my invention to provide an automatically operated mechanism to perform these operations efficiently and rapidly.

An object of my invention is to provide a mechanism for automatically arranging work pieces in predetermined relation, feeding them to a work station, applying a spot of solder to each work piece, and delivering the work pieces to a traveling belt.

Another object of my invention is to provide a mechanism of the character described in which the disks are initially fed by gravity and then positively positioned for depositing on each disk a spot of solder.

More specifically, it is an object of my invention to provide a mechanism for applying a spot of solder to the same side of each of a series of metal disks having concave-convex central portions.

Other objects and advantages will be apparent from the preferred embodiment of my invention which is shown by way of example in the accompanying drawings wherein:

Fig. 1 is a side elevation showing one of my machines and parts of an adjacent machine in a group of the same arranged with a common delivery belt which is shown in part only;

Fig. 2 is a view on line 2—2 of Fig. 1 showing the selector which supplies the disks to the feed chute;

Fig. 3 is a section on line 3—3 of Fig. 2 showing a cross section through the selector;

Fig. 4 is a section on line 4—4 of Fig. 1 showing a cross section through the disk feeding chute and the heater mechanism, to an enlarged scale;

Fig. 5 is a view on line 5—5 of Fig. 1 showing the solder head and its operating mechanism;

Fig. 6 is an elevation of the solder head, to an enlarged scale;

Fig. 7 is an elevation of the solder head looking in the direction of line 7—7 of Fig. 6;

Fig. 8 is a detail of the solder feed on line 8—8 of Fig. 6;

Fig. 9 is a detail section with parts broken away showing the floating dog and its pivot;

Fig. 10 is a view on line 10—10 of Fig. 5 showing the structure at the solder applying station;

Fig. 11 is a plan of the finished disk; and

Fig. 12 is a cross section of the finished disk.

The preferred form of my mechanism comprises a selector or unscrambling mechanism 10, a work feed chute 11, a solder applying head 12 and a cooling belt 13. As shown in Fig. 1 a series, or group, of my machines are arranged on a table 14 by means of uprights 15 and diagonal framing 16, with a common delivery or cooling belt 13, the cooling belt 13 and the adjacent machine in the group being shown in part only.

The selector mechanism 10 and its drive mechanism 17 are mounted on the framing 16 which is attached at 18 to the upright 15. The drive mechanism 17 may be any conventional structure and operated by any conventional source of power. The selector mechanism 10 comprises a fixed cage 19 which may be metal screen, or the like, and a rotatable bottom or base plate 20 which is connected by the hub 21 to the drive mechanism 17. The bottom plate 20 is provided with spaced open-end, radial recesses, or slots, 22 which are of a width slightly greater than the diameter of the work pieces or disks 23. The work pieces or disks 23, as shown in Figs. 11 and 12, comprise an outer rim 24 and a central portion 25 which is concave-convex in cross section. Each recess 22, in the rotatable plate 20, is of a depth sufficient to retain therein a disk 23, when the disk 23 is arranged with the concave side of the central portion 25 thereof adjacent the bottom surface of the recess, but not sufficient to retain a disk, when the convex side of the central portion 25 thereof is adjacent the bottom surface of the recess. The length of each recess 22 is somewhat greater than the diameter of a disk 23. The bottom plate 20 is provided with an annular recess 26 which extends radially from the inner edge of the recesses 22 towards the center of the plate 20 to accommodate an arcuate inner guard plate or guide member 27 and the receiving end 28 of the feed chute 11. The guide member 27 extends from the left side of the cage 19, as shown in Fig. 2, along the inner edge of the recesses 22, to the top of the cage 19 where it terminates adjacent the open end 28 of the feed chute 11. The guide member 27 is secured in position on the disk 20 by strap members 29 and 30. A supply of the disks 23 is placed in the bottom of the selector 10 and the plate 20 is rotated by its drive mechanism 17 in a clockwise direction. The work pieces 23 which are arranged in the proper position, that is, with the concave face of the central portion 25 adjacent the inner face of the bottom plate 20, are picked up in the slots 22 and carried to the top of the selector 10 where they slide into the end 28 of the feed chute 11 and are carried by gravity down the chute towards the end 31 of the same. The guide member 27 retains the work pieces 23 in the slots 22 until they reach the open end 28 of the chute 11.

Intermediate the ends 28 and 31 of the chute 11 the chute is twisted through 180° so that work pieces 23 entering the top end 28 with the concave side down arrive at the bottom end 31 thereof with the concave side uppermost. As shown in Fig. 4 the chute 11 comprises a bottom portion 32 and parallel channel forming side portions 33, 34, defining a channel 35 which receives the work pieces 23 and guides them therein during their travel from one end 28 to the other end 31 of the same.

Adjacent the lower end 31 of the chute 11 a heating means is provided to heat the bottom 32 of the chute and the work pieces 23 which are carried in the channel 35 at that point. The heating means comprises a perforated gas burner 36 having perforations 37 from which flames 38 are directed against the bottom 32 of the feed chute 11. The burner 36 is connected with a gas supply by the pipe 39 having conventional valve 40.

The lower end 31 of the feed chute 11 is attached to a table 41 by means of a bracket 42. The table 41 supports the solder head 12 and its drive mechanism.

The solder head 12 is supported on the table 41 by means of an upright or post 43 which is attached to a base plate 44. The base plate 44 is adjustably supported on the table 41 by means of a pin 45 and a slot 46. The pin 45 has a locking nut 47 controlled by a handle 48. The solder head 12 comprises a hollow supporting stem 49 which is adjustably positioned on the post 43 and secured thereto by a wing head threaded stud 50 which is rotatable in the threaded aperture 51 in the supporting stem 49 and engages against the post 43. The stud 50 may be provided with a conventional locking nut, if desired. Laterally extending brackets 52, 53 and 54 are rigidly secured to the stem 49 by brazing, or similar means of attachment and provide a support for a solder receiving tube 55 which is arranged in parallel relation with the supporting stem 49 and receives a solder wire or stick 56 the tip of which is shown at 57. The solder receiving tube 55 is made in two sections, the top section 58 being permanently secured in brackets 52, 53 while the bottom or tip section 59 is removably secured in brackets 53, 54 by the set screw 60 in the bracket 54. A reciprocable sliding frame 61 is provided which comprises an upper member 62 having a bore 63 in which the solder receiving tube 55 is slidingly received. The end of the upper member 62 adjacent the stem 49 is recessed at 64 and slidingly engages against the surface of the stem 49. The lower member 65 of the frame 61 has a bore 66 for slidingly receiving the solder tube 55 and is recessed at 67 for sliding engagement with the stem 49. The upper and lower members 62, 65 are connected by the vertical members 68 which slidingly engage on opposite sides of the bracket 52. The lower member 65 carries a movable dog 69 pivoted thereto at 70 in a recess 71 in the member 65. The dog 69 is urged toward the solder tube 55 by a spring 72. The solder tube 55 is cut away on one side at 73 so that the end of the dog 69 will engage with the solder stick 56 in the tube 55. The sliding frame 61 is urged into retracted position by the spring 74 which extends from a set screw 75 on the top member 62 of the frame 61 to a top bracket member 76 extending laterally from the supporting tube 49 and rigidly secured thereto at 77 in any conventional manner. A floating dog 78 is supported in the laterally extending fixed bracket 53 on a pin 79 which is received in a slot 80 in the recess 81 in the bracket 53. The end of the dog 78 is urged into engagement by the spring 82 with the solder 56 in the tube 55 which is cut away on the one side at 83 to expose the solder stick. Spring 84 engages the pivoted end of dog 78 and urges it forwardly.

The sliding frame 61 is reciprocated by means of an operating mechanism 85 cooperating with the spring 74 to feed the solder in the soldering operation. The operating mechanism 85 (Figs. 5 and 7) comprises an angular arm member 86 pivoted at 87 to a bracket 88 fixedly secured as by welding or the like at 89 to the supporting post 49. An extension 90 of arm 86 carries an angular member 91 pivoted thereto at 92 and having a rounded boss or projection 93 which engages the upper member 62 of frame 61. A spring 94 is attached to a pin 95 on arm 86 and to upstanding arm 96 of angular member 91. Adjustment of angular member 91 is provided by wing headed stud 97 which is threaded through the arm 90 and engages lateral arm 98 of member 91. A locking nut 99 is provided on stud 97 to lock the stud 97 in adjusted position.

The driving means for the operating mechanism 85 is supported on the table 41 (Fig. 5), which is mounted on the table 14 by legs 100, and extends transversely of the machine. A compressed air motor 101 is mounted on the table 41 by posts 102 and connected by supply line 103 to a source of compressed air. The motor is of conventional construction and operates a vibrating arm 104 which is adjustably connected to link 105 by a pin and slot connection 106. Link 105 is pivotally connected at 107 to shaft 108 which is slidably mounted in bearings 109 attached to the table 41. A sleeve section 110 secured to the shaft 108 by a set screw 111 carries spaced projecting pins 112 between which the lower end 113 of the arm 86 is received. Vibration of arm 104 on the motor 101 reciprocates the movable frame 61 by means of the link 105, sliding shaft 108, and arm 86, cooperating with the spring 74, in an obvious manner.

The solder 56 is fed downwardly in the tube 55 in the following manner: The sliding frame 61 is moved downwardly by the operating mechanism 85 and the movable dog 69, which is held in engagement with the solder stick 56 by means of spring 72, moves the solder 56 downwardly a predetermined amount. The solder tip 57 engages a heated disk and leaves a deposit of solder on the disk. The sliding frame 61 is retracted by the spring 74 and it tends to retract the solder stick also because of the spring-pressed engagement of the movable dog 69 with the exposed side of the solder stick 56 at 73. The dog 78, on the fixed bracket 53, is urged by the springs 82, 84 against the solder 56 and has a limited upward movement due to the pin-and-slot connections 79, 80 between the dog and the bracket 53. The length of the slot 80 is such that it permits the solder stick to be retracted a limited distance, against the resistance of spring 84. The spring 72 operating against the dog 69 is sufficient to overcome the resistance of the spring 84 and retracts the solder the distance permitted by movement of pin 79 in the slot 80. Then springs 82, 84, operating against the dog 78, overcome the effect of the spring 72, operating against the movable dog 69, and prevent further retraction of the solder stick. The frame 61, however, retracts a further distance without moving the solder stick, the dog 69 merely sliding along the solder stick. In this manner, the movement of the frame 61 and the operation of the dogs 69 and 78 brings the solder stick downward a predetermined distance and then retracts it a lesser distance to compensate for the amount of solder which is deposited on a heated disk at each operation of the mechanism.

The reciprocating shaft 108 (Fig. 5) also carries an ejector plate 114 at the end thereof. The feed chute terminates at the lower end 31 in laterally extending portion 115 (Fig. 10) in which the guide channel 116 is a right angular extension or continuation of guide channel 35. An aperture 117 is provided in the wall of the feed chute aligned with the guide channel 116 in which the ejector plate 114 operates to feed the disks 23 laterally into the channel 116. The solder head 12 is adjusted with respect to the axis of the chute 11 so that it deposits a spot of solder 118 on a disk which has been moved a predetermined distance along the channel 116 by operation of the ejector slide 114. The slide 114 does not move a disk the full length of channel 116 but only into position for receiving the solder 118 from the head 12 as indicated at 119 in Fig. 10. The laterally extending chute portion 116 extends to a point beyond the solder applying position 119 and the finished disks are delivered to the upper run of the cooling belt 13 by operation of the ejector plate 114. The arrangement is such that each disk 23 is moved by plate 114 to the position 119 where the solder 118 is deposited on it by the operation of the solder head 12 and then moved along by contact of the disks which follow it to the end of the chute 116 where it is ejected onto the belt 13. The purpose of offsetting the solder head 12 with respect to the axis of the feed chute 11 is to insure that there will be a disk beneath the solder head to receive the deposit of solder when there is a failure or an interruption of the feed of the disks to the end 31 of the chute 11. Obviously, when a disk 23 is delivered by ejector plate 114 to the solder applying position 119 it will remain in that position beneath the solder head 12 until it is moved along the channel 116 by movement of a succeeding disk. If a succeeding disk is not delivered by the ejector plate 114 because of a failure in the supply the continued operation of the solder head 12 will not pile up solder in the channel but successive deposits will be received on a disk which can be later removed from the cooling belt 13 by the machine attendant.

The endless cooling belt 13 is mounted on pulleys 120 mounted in bearings 121 supported from the table 14 by frame 122. The belt 13 is guided in channels 123 supported above table 14 on standards 124. The upper run of the belt 13 passes adjacent the laterally extending chute portion 116 and the soldered disks are successively deposited thereon. The belt may be wide enough to receive in offset lines the completed work pieces from a number of my soldering machines arranged on a single table or supporting structure 14.

The solder 56 may be fed to the machines in lengths or as illustrated from a roll 125 mounted on a supporting frame 126 above the soldering head 12.

I have disclosed my machine for use in applying a spot of solder to a battery top disk, but I do not intend to limit the use of my device to such work pieces since it will be apparent that it may be used to apply solder to other articles.

While I have described specific details of materials and constructions incorporated in the preferred form of my machine, it is contemplated that other materials and structures may be resorted to within the scope of my invention.

I claim:

1. A soldering machine for depositing spots of solder on one side of disk-like objects which have a center portion convex on one surface and concave on the opposite surface comprising a selector mechanism for arranging the disks in the same predetermined relation, a solder head, a guideway beneath said solder head adapted to receive a plurality of said disks in a line, a heated gravity chute for delivering the successive disks from the selector mechanism to one end of said guideway, means for intermittently ejecting successive disks from the end of the chute into said guideway, said ejecting means having a limited movement whereby upon failure of said chute to deliver disks thereto movement of the line of disks in said guideway is interrupted, intermittently operated means on the solder head for depositing a spot of solder on each successive disk as it rests momentarily beneath the solder head, means operating the ejecting means and the solder depositing means in proper sequence.

2. In a solder applying machine having means to successively deliver work pieces to a predetermined position for the application of solder thereto, a solder head comprising a supporting post, laterally extending spaced brackets, a solder guiding tube having cut-away portions mounted parallel to said post on certain of said brackets, a solder gripping means on another of said brackets engaging solder in said tube at one of said cut-away tube portions, a reciprocating frame mounted on the post to reciprocate parallel thereto, a solder gripping means on said frame engaging the solder in said tube at another of said cut-away tube portions, means for reciprocating said frame to intermittently feed the solder in the tube.

3. Mechanism as claimed in claim 2 wherein said gripping means on said bracket comprises a spring-pressed dog.

4. Mechanism as claimed in claim 2 wherein said gripping means on said bracket comprises a spring-pressed dog having a floating pivotal connection with said bracket.

5. Mechanism as claimed in claim 2 wherein said gripping means on said bracket comprises a spring-pressed dog having a floating pivotal connection with said bracket, said pivotal connection permitting movement of the solder in one direction and limited movement of the solder in the other direction.

6. Mechanism as claimed in claim 2 wherein said gripping means on said bracket comprises a spring-pressed dog having a floating pivotal connection with said bracket, which comprises a pin on one of said members engaging in a slot in the other member, the length of the slot permitting limited reverse movement of the solder whereby the solder will be fed a predetermined distance in one direction by the gripping means on the reciprocating frame and a predetermined smaller distance in the reverse direction.

7. In a solder applying machine, a supporting post, a solder guiding tube mounted on said post and having spaced apertures in a wall thereof, a movable frame mounted adjacent said post, means for reciprocating said frame lengthwise of said tube, a pivotally mounted dog on said frame spring-pressed into engagement with the solder in said tube through one of said apertures, a floating dog mounted adjacent another of said apertures spring-pressed into engagement with the solder in said tube and having a limited retractive movement whereby movement of the reciprocating frame in one direction will move the solder a predetermined amount while movement in the other direction will retract the solder a predetermined lesser amount.

ROLAND G. REYNOLDSON.

REFERENCES CITED

The following references are of record in the file of this patent:

UNITED STATES PATENTS

| Number | Name | Date |
|---|---|---|
| 845,415 | Hicks | Feb. 26, 1907 |
| 961,743 | Ayars | June 14, 1910 |
| 1,049,227 | Guenther | Dec. 31, 1912 |
| 1,053,634 | Nagy | Feb. 18, 1913 |
| 1,195,054 | McLeod | Aug. 15, 1916 |
| 1,439,807 | Ericson | Dec. 26, 1922 |
| 1,469,557 | Goebel | Oct. 2, 1923 |
| 1,652,032 | Lynch | Dec. 6, 1927 |
| 1,660,549 | Davis | Feb. 28, 1928 |
| 1,676,615 | Loesel | July 10, 1928 |
| 1,748,938 | Austin | Mar. 4, 1930 |
| 1,749,719 | Reiter | Mar. 4, 1930 |
| 2,296,158 | Gardner | Sept. 15, 1942 |
| 2,357,683 | Nelson | Sept. 5, 1944 |